May 20, 1958 J. R. DAY 2,835,802

LINEAR FREQUENCY MODULATION DETECTOR

Filed Oct. 12, 1953 3 Sheets-Sheet 1

INVENTOR.
James R. Day

BY Moses, Nolte, Crews & Berry
ATTORNEYS

May 20, 1958 J. R. DAY 2,835,802
LINEAR FREQUENCY MODULATION DETECTOR
Filed Oct. 12, 1953 3 Sheets-Sheet 2

INVENTOR:
James R. Day

BY Moses, Nolte, Crews & Berry
ATTORNEYS

LINEAR FREQUENCY MODULATION DETECTOR

Filed Oct. 12, 1953

INVENTOR.
James R. Day

BY Moses, Nolte, Crews & Berry
ATTORNEYS

United States Patent Office 2,835,802
Patented May 20, 1958

2,835,802

LINEAR FREQUENCY MODULATION DETECTOR

James R. Day, Peconic, N. Y.

Application October 12, 1953, Serial No. 385,368

4 Claims. (Cl. 250—27)

The present invention relates to detectors for demodulating frequency modulated waves and more particuluarly to discriminators or detectors of this character in which the percent modulation of the wave to be demodulated is amplified by phase shifting means.

It is an object of the present invention to provide an improved and highly linear detector or discriminator for demodulating a frequency modulated wave.

A further object of the invention is the provsion of a demodulator or detector of this character, in which the signal to be demodulated is simultaneously applied to two transmission paths. Phase shifting means are provided either in one path or in both of these paths and are so arranged that the amount of phase shift varies linearly with respect to the frequency in each of the two paths.

Another object of the invention is to provide a detector or discriminator of this character in which the phase shifted frequency modulated signals in each path are limited to produce two waves of constant amplitude, the two waves being suitably combined in a phase comparator switch to produce an output wave of rectangular shape and constant amplitude, the time base width of each element of the wave varying linearly in accordance with the deviation of the incoming wave from its center or unmodulated frequency.

Another object of the invention is the provision of novel phase comparator switching means.

Still another object of the invention is to provide a discriminator or detector of this character in which one or more smooth transmission lines are used to provide a uniformly linear phase shift with respect to frequency over a wide frequency range.

Other and further objects will become apparent upon reading the following specification together with the accompanying drawing forming a part hereof.

Referring to the drawing.

Figure 1:
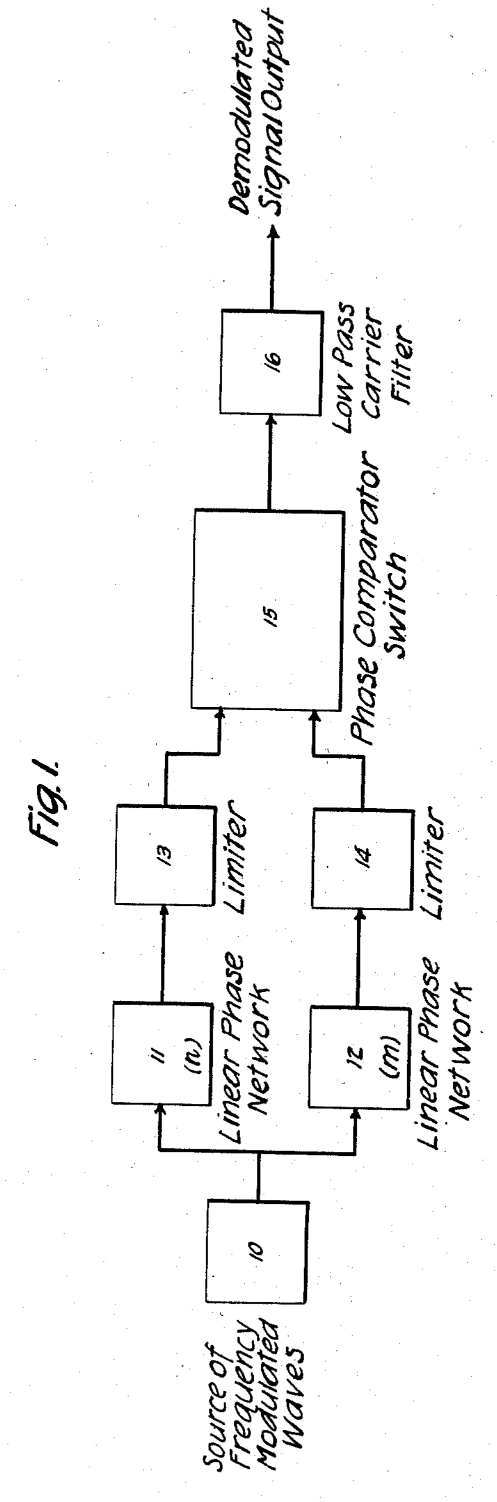
Fig. 1 is a block diagram illustrating an embodiment of the invention.

Referring to Fig. 1, there is shown a source 10 of frequency modulated waves which are to be demodulated. The source 10 is connected jointly and concurrently to the inputs of two linear time delay phase displacement networks 11 and 12. The time delay phase displacement network 11 of the upper transmission path has a phase displacement factor $n$ and the phase displacement network 12 of the lower path has a phase displacement factor $m$ as described in greater detail below.

The output of the upper linear time delay phase displacement network 11 is applied to the input of a limiter

13 and the output of the other linear phase displacement network 12 of the lower branch is applied to a similar limiter 14.

The outputs of the two limiters 13 and 14 are individually applied to the two inputs of a phase comparator switch 15 whose output is passed through a low pass filter 16 for deriving the demodulated signal output.

The source 10 of the frequency modulated waves will usually be an amplifier plate circuit in the high level section of a receiver. The two linear time delay phase networks 11 and 12 are characterized by imparting to the wave a phase shift proportional with a high degree of precision to the frequency of the wave. This phase shift involves a delay in time of transmission, or a phase shift of an effective electrical length, expressed in terms of wavelengths. The electrical length of the upper network is $n$ wavelengths and that of the lower network is $m$ wavelengths, $m$ and $n$ not necessarily being integers. These electrical lengths are defined for the average or unmodulated value of the frequency modulated input wave. Both networks will ordinarily be so terminated so that there are no reflections from their respective outputs.

As the frequency of the incoming wave varies during modulation, the fractional change in phase displacement of the two waves at the output ends of the two phase displacement networks 11 and 12 will be $n$ or $m$ times as great as the fractional change of frequency at their respective input ends. For example, if the incoming wave is modulated plus-or-minus 2% in frequency, and $n$ is 6.2 wave lengths, the change in phase at the output end of this delay line will be plus-or-minus 12.4% of one vector revolution of 360° (one full wave length), or plus-or-minus 44.46 degrees. For a value of $n$ greater than $m$, the percent relative change of phase at the two output ends is $n-m$ times the percent change in frequency. In particular, if $m=0$, the relative phase of the output of the upper circuit with respect to that of the lower circuit is $n$ times the percent change of frequency of the input wave.

For practical purposes, and in order to simplify the actual construction of the device, either one of the two linear phase delay networks 11 or 12 may be omitted so that the phase shift purposely introduced into one of the two transmission paths is zero.

The limiters 13 and 14 may not be essential in instances where there is sufficient limiting action in the source of frequency modulated waves 10. The limiters 13 and 14 are substantially identical and their output amplitudes are substantially equal. The phase comparator switch 15 is generally a device which develops a rectangular wave of constant voltage originated by the positive going edge of the signal derived from one input wave and terminated by the negative going edge of the other input wave, maintaining a constant amplitude during the interval between these two wave edges. During the interval when the instantaneous polarities of both waves are reversed, the amplitude of the rectangular wave is zero.

The following is a general example of the operation of the phase comparator switch 15:

Let $m=0$, $n=6.2$ wave lengths, assuming the average or unmodulated frequency of the input wave to be 10 million cycles per second, peak modulated plus-or-minus 2% or two hundred thousand cycles per second. Further, assume the phase displacement networks 11 and 12 to be so adjusted that the positive going leading edge of the square wave of the output is established by the wave for $m=0$, where the phase angle is unchanged and the trailing negative going edge is determined by the wave for $n=6.2$. During modulation, the positive part of the constant amplitude square output wave will vary in duration by a maximum of plus-or-minus 44.46 electrical degrees. The output wave will also contain components at the carrier frequency and its harmonics in addition to the modulating frequencies. The instantaneous percent variation in the average value of the rectangular output wave will always be 6.2 times the instantaneous percent variation in the frequency of the input wave, and this value can be termed the magnification factor of the device. The carrier and its harmonics may be conveniently removed by the low pass filter 16 and the modulating frequencies recovered at the filter output, thereby completing the desired process of demodulation.

Figure 2:
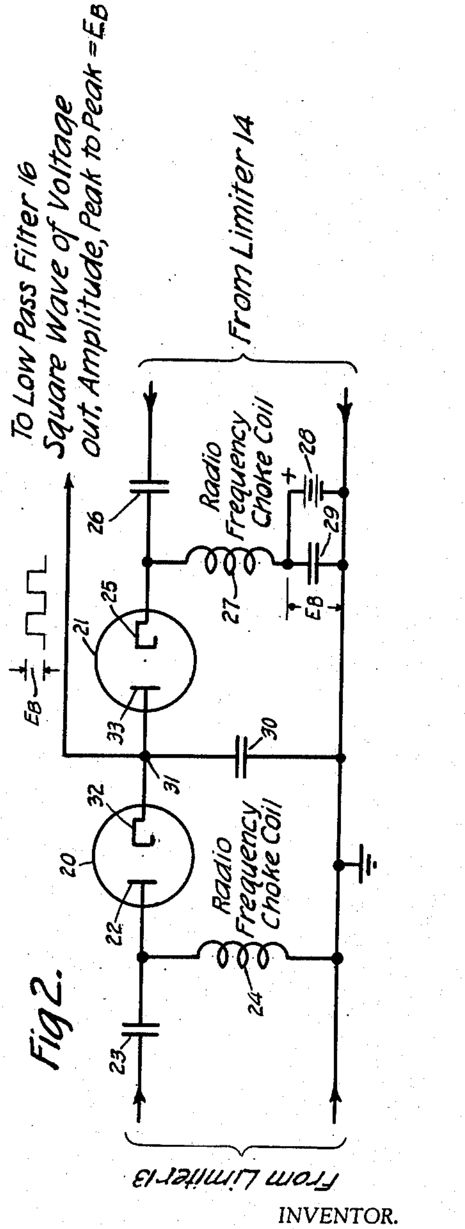
Fig. 2 is a schematic circuit diagram of a phase comparator switch suitable for use in Figure 1.

Referring to Fig. 2, there is shown by way of illustration a phase comparator switch suitable for use in Fig. 1. The switch illustrated comprises two serially connected diodes 20 and 21 arranged to conduct current in the same direction and which may be of the thermionic or contact type. The output from limiter 13 in the upper transmission path is connected to the anode 22 of diode 20 through a coupling capacitor 23, the direct current portion of the circuit being completed through a radio frequency choke coil 24 having a high impedance at the unmodulated carrier frequency.

The output from the other limiter 14 in the lower transmission path is connected to the cathode 25 of the other diode 21 through a coupling capacitor 26, the direct current portion of the circuit being completed through a radio frequency choke coil 27 similar to choke 24 and a source of biasing potential illustratively shown as a battery 28 by-passed by a low impedance capacitor 29.

A grounded output capacitor 30 is connected to the junction 31 between the cathode 32 of diode 20 and the anode 33 of diode 21. The capacitance of capacitor 30 is normally several times the capacitance of the coupling capacitors 23 and 26.

In operation, the limited output wave from limiter 13 is applied through the coupling capacitor 23 to the anode 22 of the diode 20. The leading edge of the positive going portion of this wave will cause diode 22 to conduct, thereby building up a charge in the output capacitor 30. When the potential across output capacitor 30 exceeds the biasing potential $E_b$ of battery 28, then diode 21 will conduct and the excess charge will be drained off through the choke coil 27.

The output wave from the other limiter 14 is applied through the other coupling capacitor 26 to the cathode 25 of diode 21. The positive going portion of this wave cannot affect the potential of output capacitor 30 because diode 21 is non-conductive in this direction, and if the positive potential rises above that of biasing battery 28, the excess will be drained off through choke coil 27. When the negative going portion of this wave is applied through coupling capacitor 26 to the cathode 25 of diode 21, this causes diode 21 to become conductive, whereby output capacitor 30 is discharged to zero or ground potential.

In this manner, the output capacitor 30 is first charged to the biasing potential $E_b$ by the positive going portion of the wave applied to the diode 20 and is discharged to zero potential by the negative going portion of the wave applied to diode 21. The maximum voltage to which output capacitor 30 may become charged is limited by the fixed potential of the biasing battery 28.

If the two waves from the limiters 13 and 14 are displaced in phase with respect to each other, then the interval during which output capacitor 30 will remain charged will be determined by the difference in phase between the two waves. The voltage across output capacitor 30 will then be a positive going wave of rectangular wave shape. The average value of each successive half-wave element of this wave will vary linearly with respect to frequency variations in the source 10 of the frequency modulated waves. This wave of rectangular form is passed through the low pass filter 16 to remove the undesired high frequency components therefrom and the desired modulations of the source 10 are available for use by any desired utilization means (not shown) which may be connected to the output of the filter 16.

Figure 3:
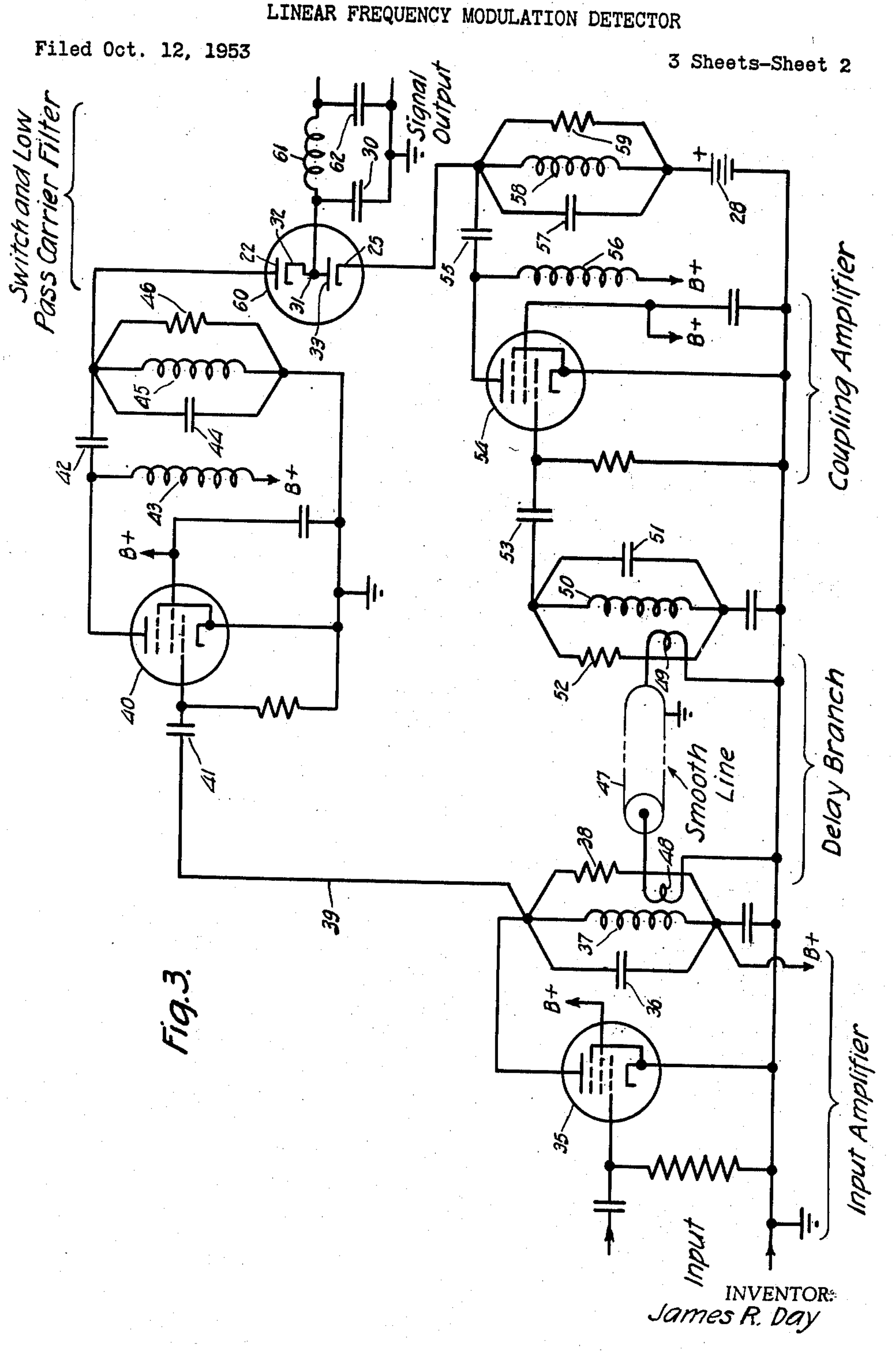
Fig. 3 is a schematic circuit diagram of a complete frequency modulation detector or discriminator in accordance with the invention.

Referring to Fig. 3, there is shown a complete demodulator in accordance with the invention. The input from the source 10 is applied to a conventional input amplifier stage comprising the pentode 35. The output circuit of pentode 35 includes a highly damped parallel resonant coupling circuit consisting of the capacitor 36, the inductor 37 and the damping resistor 38. The parallel circuit 36—37—38 is resonant at the center frequency of the input carrier wave and is sufficiently damped so that no apreciable phase non-linearity is encountered within the frequency range of the frequency modulated input wave.

The upper branch of the circuit includes a direct connection 39 from the output circuit of pentode 35 to a pentode amplifier 40 through a coupling capacitor 41. The output of pentode 40 is coupled through a coupling capacitor 42 and a radio frequency choke 43 to a highly damped parallel resonant coupling circuit consisting of a capacitor 44, an inductor 45 and a damping resistor 46, the charcteristics of the resonant circuit 44—45—46 being generally similar to those of the highly damped parallel resonant circuit 36—37—38.

The transmission path through the lower branch of the circuit comprises a smooth transmission line 47 such as a coaxial cable or other similar transmission line having uniformly distributed inductance and capacitance throughout its length. The phase shift during transmission through such a line is proportional to the expression $2\pi f\sqrt{LC}$ per unit length of the line, where $f$ is the frequency of the wave and L and C are respectively the equivalent inductance and equivalent capacitance per unit length. Since the values of L and C are fixed for any particular line, the phase shift is directly proportional to the frequency of the wave. The phase shift is thus aperiodic, and if plotted graphically, is linear and involves no curvature as do resonant means.

The input end of transmission line 47 is connected to an impedance matching winding 48 which is magnetically coupled to the inductor 37 of the highly damped parallel resonant coupling circuit 36—37—38. The output end of transmission line 47 is connected to another impedance matching winding 49 which is magnetically coupled to an inductor 50.

The inductor 50 forms a part of another highly damped parallel resonant coupling circuit consisting of the inductor 50, a capacitor 51 and a damping resistor 52. The characteristics of the resonant circuit 50—51—52 are similar to those of resonant circuit 36—37—38 described above.

Resonant circuit 50—51—52 is connected through a coupling capacitor 53 to the input of a pentode amplifier 54. The output of amplifier 54 is coupled through a coupling capacitor 55 and radio frequency choke 56 to another highly damped parallel resonant coupling circuit consisting of a capacitor 57, inductor 58 and damping resistor 59. The characteristics of resonant circuit 57—58—59 are similar to those of resonant circuit 36—37—38 described above.

The outputs of the two parallel resonant circuits 44—45—46 and 57—58—59 are connected to a twin diode 60 which is arranged as described above for the two individual diodes 20 and 21 of Fig. 2. The biasing potential from battery 28 is fed through the inductor 58.

A filter choke 61 and filter capacitor 62 constitute the low pass filter 16 of Fig. 1.

If desired, the amplifier stages 40 and 54 may be arranged to have limiting characteristics, or additional limiter stages may be provided, so that the effect of the limiters 13 and 14 of Fig. 1 may be obtained.

Figure 4:
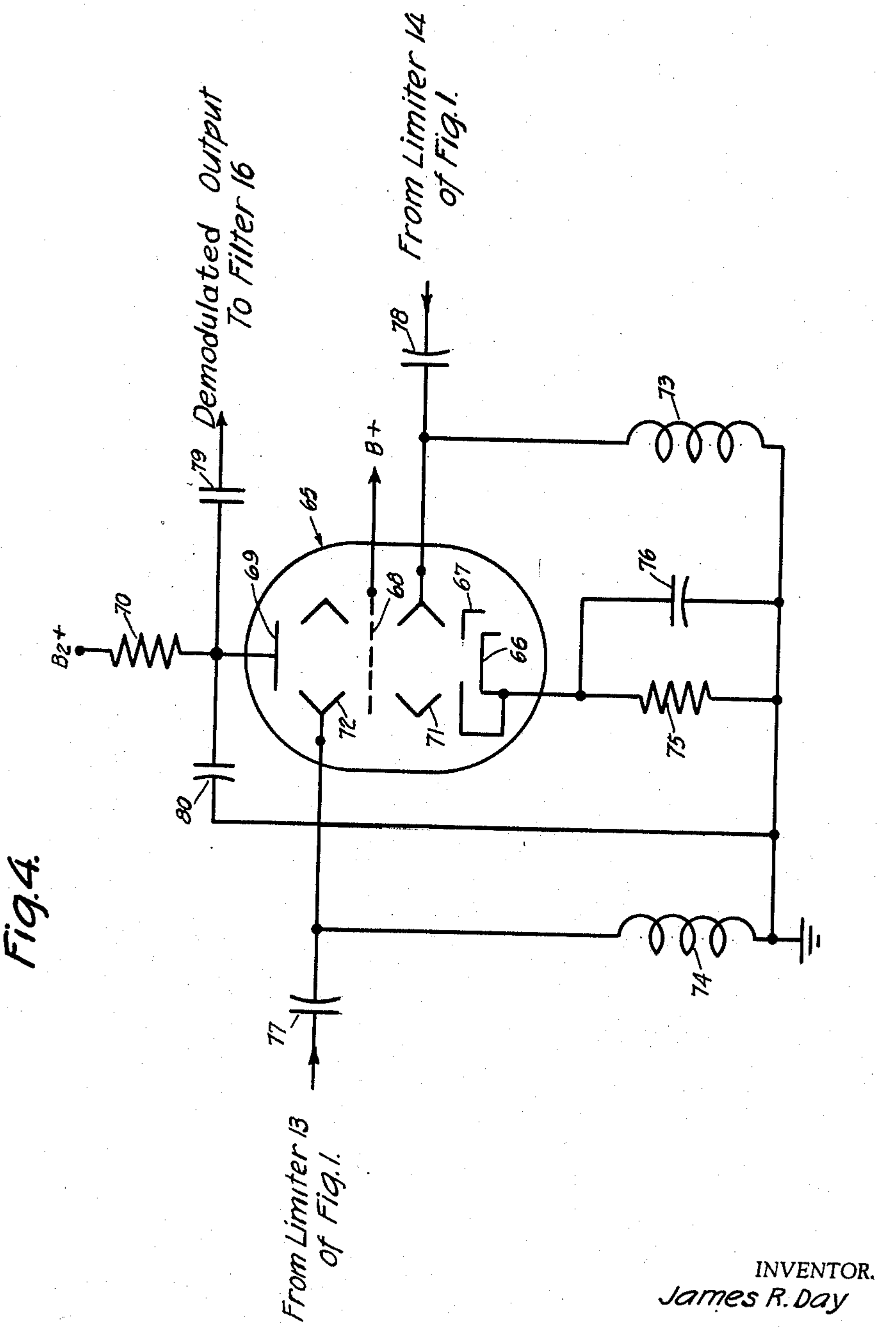
Fig. 4 is a schematic circuit diagram of a modified form of phase comparator switch.

Referring to Fig. 4, there is shown a modified form of rectangular wave detection device or phase comparator switch comprising a gated beam power tube of the 6BN6 type.

The 6BN6 tube, designated generally as 65, comprises an electron gun structure including a cathode 66 and an apertured electrode 67 connected directly to the cathode 66 for producing a relatively narrow beam of electrons. The electrons are accelerated by an accelerating anode 68 connected to a suitable low impedance source of positive potential indicated as $B_1+$. The electron beam from cathode 66 is ultimately attracted to an anode 69 which is maintained at a suitable positive potential by a source designated $B_2+$ which is connected to anode 69 through a coupling impedance shown illustratively as a resistor 70.

The beam power tube 65 further comprises two independent deflection electrodes 71 and 72 which produce a lateral deflection of the electron beam. If energized at a sufficiently large potential, either of the two deflecting electrodes 71 or 72 can deflect the electron beam from cathode 66 by an amount sufficient to produce substantially complete cut-off of the current flow at anode 69.

The deflecting electrodes 71 and 82 are electrostatically maintained at ground potential by means of the radio frequency choke coils 73 and 74 respectively, this potential being negative relative to the cathode 66 by reason of the voltage drop across cathode resistor 75, the cathode resistor 75 being by-passed by a capacitor 76 to avoid degenerative effects.

The output of limiter 13 of Fig. 1 is coupled through a capacitor 77 to the deflecting electrode 72 and the output of limiter 14 is coupled through a similar capacitor 78 to the other deflecting electrode 71.

Alternatively, the output of resonant circuit 44—45—46 of Fig. 3 may be coupled to one of the deflecting electrodes 71 and 72 and the output of resonant circuit 57—58—59 may then be coupled to the other deflecting electrode, the biasing battery 28 being omitted.

In operation, the two frequency modulated waves displaced in phase with respect to each other by an amount which varies with the frequency of the incoming frequency modulated wave are applied to the deflecting electrodes 71 and 72 at amplitudes sufficient to produce a sharp cut-off of anode current at anode 69. This results in production of a rectangular voltage wave across anode resistor 70, and this wave is passed through a blocking capacitor 79 to the input of the low pass filter 16. Some of the radio frequency components are by-passed to ground by the capacitor 80 thereby relieving the low-pass filter 16 of a portion of its burden. If the filtering action of by-pass capacitor 80 is sufficient, the low pass filter 16 may be omitted entirely.

It is to be noted that the same time delay phase displacement principle of magnification of percent modulation may be obtained by the use of multiple coupled resonant circuits, but the results will not be inherently ideal as with a smooth transmission line, since the phase shift magnification and linearity must be compromised by damping.

I have described what I believe to be the best embodiments of my invention. I do not wish, however, to be confined to the embodiments shown, but what I desire to cover by Letters Patent is set forth in the appended claims.

I claim:

1. A detector for demodulating a frequency modulated wave, said detector comprising: means defining an input for the wave to be demodulated; means defining two transmission paths having their inputs both concurrently coupled to said detector input; time delay phase shifting means included in at least one of said paths, said delay means causing a shift in the phase of the wave transmitted through one of said paths relative to the wave transmitted through the other path, the magnitude of said relative phase shift varying linearly with respect to the frequency of said modulated wave; and phase comparator switching means having two inputs and an output adapted for connection to signal utilization means, one of said switch inputs being coupled to the output of one of said paths and the other switch input being coupled to the output of the other of said paths, said switching means comprising means for producing a wave of rectangular wave form and including means for maintaining the amplitude of said rectangular wave constant, said rectangular wave producing means including means responsive to one of said switch inputs for initiating each element of said rectangular wave and means responsive to the other switch input for terminating each element of said rectangular wave, said rectangular wave being delivered to said switch output, whereby said utilization means may receive from said switch output a wave having an average amplitude which follows the modulations of said frequency modulated wave.

2. A detector according to claim 1, further comprising a limiter connected in each of said two transmission paths.

3. A detector according to claim 1, wherein said rectangular wave producing means comprises: two serially connected diodes having one electrode of one connected to one electrode of the other diode so that they are arranged to conduct current in the same direction; circuit means constituting one of said switch inputs connected to the other electrode of one of said diodes; further circuit means constituting the other of said switch inputs connected to the other electrode of the other diode; a source of biasing potential having one terminal connected to one of said other electrodes, the polarity of said source being in the non-conductive direction with respect to the diode to which it is connected; and an output capacitor having one terminal connected to the junction between said diodes and to said switch output, said capacitor being charged to said biasing potential through one of said diodes and discharged through the other, one side of each of the switch inputs and the other terminal of the capacitor and the other terminal of the source of biasing potential being connected to a common point, said rectangular wave being produced across said capacitor.

4. A frequency modulation detector comprising: two serially connected diodes having one electrode of one connected to one electrode of the other diode so that they are arranged to conduct current in the same direction; first circuit means constituting an input to said detector connected to the other electrode of one of said diodes; second circuit means constituting another input to said detector connected to the other electrode of the other diode; a source of constant biasing potential having one terminal connected to one of said other electrodes, the polarity of said source being in the non-conductive direction with respect to the diode to which it is connected; and an output capacitor having one terminal connected to the junction between said diodes, one side of said first and second circuit means and the other terminal of said capacitor and the other terminal of said source of biasing potential being connected to a common point, said capacitor being charged to said biasing potential through one of said diodes and discharged through the other, a rectangular wave of constant amplitude being produced across said output capacitor, the duration of each element of said rectangular wave being determined by the difference in phase between two waves separately applied to said two inputs, and an output connection extending from said junction.

(References on following page)

References Cited in the file of this patent

UNITED STATES PATENTS

| | | |
|---|---|---|
| 1,613,626 | Bijl | Jan. 11, 1927 |
| 2,087,429 | Crosby | July 20, 1937 |
| 2,111,737 | Roberts | Mar. 22, 1938 |
| 2,230,212 | Crosby | Jan. 28, 1941 |
| 2,302,834 | Bliss | Nov. 24, 1942 |
| 2,496,063 | Mural | Jan. 31, 1950 |
| 2,499,742 | Goodall | Mar. 7, 1950 |
| 2,519,836 | Hurault | Aug. 22, 1950 |
| 2,520,419 | Mak | Aug. 29, 1950 |
| 2,523,043 | Metcalf | Sept. 19, 1950 |
| 2,634,369 | Swanson | Apr. 7, 1953 |
| 2,743,361 | Bauman | Apr. 24, 1956 |